No. 866,568. PATENTED SEPT. 17, 1907.
H. BLEIL.
BICYCLE PEDAL.
APPLICATION FILED MAY 28, 1907.
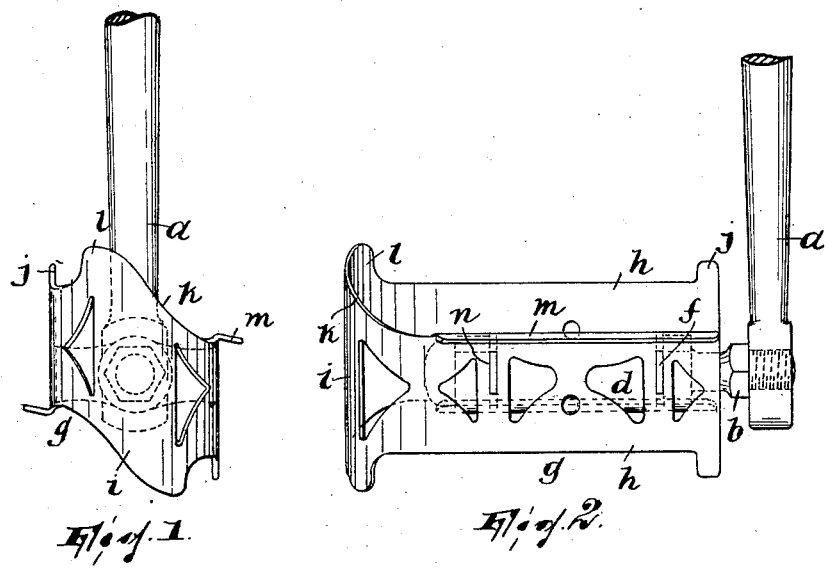
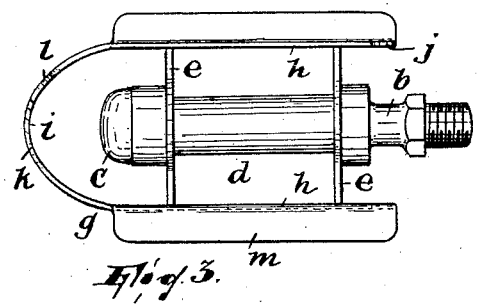
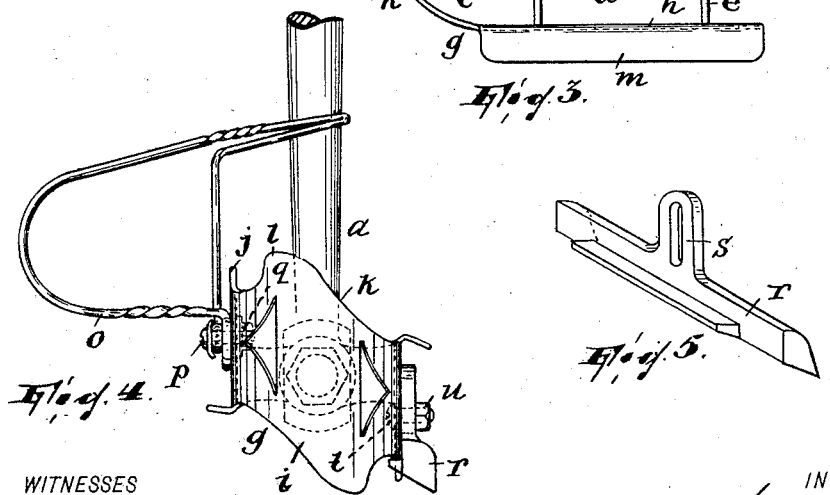
WITNESSES
INVENTOR
Herman Bleil
BY
Gartner Steward,
ATTORNEYS.

UNITED STATES PATENT OFFICE.

HERMAN BLEIL, OF PATERSON, NEW JERSEY.

BICYCLE-PEDAL.

No. 866,568.  Specification of Letters Patent.  Patented Sept. 17, 1907.

Application filed May 28, 1907. Serial No. 376,113.

*To all whom it may concern:*

Be it known that I, HERMAN BLEIL, a citizen of the United States, residing in Paterson, Passaic county, New Jersey, have invented certain new and useful Improvements in Bicycle-Pedals; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The purpose of this invention is to provide a bicycle pedal which shall be simple in construction and may be manufactured at a minimum cost and which shall present to the rider's foot such a formation as to render it practically unnecessary to form teeth on the pedal, provide it with rubber pads, etc., in order to prevent the rider's foot from slipping forward, as often occurs.

My invention will be found fully illustrated in the accompanying drawings, wherein, Figure 1 is an outside view of the pedal or bearing member; Fig. 2 is a rear view; Fig. 3 a top plan view; Fig. 4 a view similar to Fig. 1 showing the pedal with a toe-clip and balance weight therefor attached; and, Fig. 5 shows the balance weight.

In said drawings, $a$ is the pedal crank of the bicycle and $b$ is the pedal shaft or axis secured in the crank in the usual manner.

On the shaft $b$, secured by a nut $c$, is arranged the barrel $d$, the same carrying the cross pieces or plates $e$, which may be flat metal pieces having their ends reduced, as at $f$ in Fig. 2.

$g$ is the tread portion proper of the pedal. This is a blade or strip of metal whose two end-portions $h$ form the foot-supporting members and stand parallel with the barrel $d$ and whose intermediate portion $i$ is bent or curved around the nut $c$. The end-portions $h$ are reversed complements of each other. One edge of each at its inner end has the lug or abutment $j$ while at its outside end it combines with the upwardly curving edge $k$ of the intermediate part $i$ to form the abutment $l$. The corresponding edge of the other end-portion $h$ is bent-over, outwardly, as at $m$, thereby affording a broad bearing where the greatest wear would come on the sole of the rider's shoe. It will be observed that the surface of the bent-over portion $m$ is in a lower plane than the edge of the first described end-portion $h$, as seen best in Fig. 2. This arrangement, combined with the fact that the sharper bearing surface for the sole of the rider's shoe is forward, enables the rider to attain a firm, natural grip on the pedal. Moreover, the bent-over portion $m$ being in effect a rearward extension of the relatively rearward foot-supporting member, it is practically impossible for the rider to tilt the pedal so far forward, either unconsciously or on account of the vibration of the vehicle, that the pedal will "roll" under his foot.

The tread portion $g$ may be secured on the cross pieces $e$, as shown, the end-portions $h$ being formed with holes $n$ corresponding to the projections $f$ of the cross pieces, which projections are fitted into the holes and then upset in a well known manner.

A toe-clip $o$ is shown attached to one of the end-portions $h$ in Fig. 4 by means of the screw $p$ and nut $q$; a balance weight $r$ is likewise shown attached to the other portion $h$, the same having a slotted shank $s$ through which a screw $t$ passes to coöperate with a nut $u$ to secure said balance weight in position.

It will be understood that my construction renders it possible to quickly change the relative position of the toe-clip and balance weight.

Having thus fully described my invention, what I claim as new and desire to secure by Letters Patent is:

1. A bicycle pedal comprising a bearing member and fixed foot-supporting members, one on each side of the bearing member, each foot-supporting member having one foot-contact portion thereof extending relatively higher than the corresponding foot-contact portion of the other foot-supporting member, substantially as described.

2. A bicycle pedal comprising a bearing member and fixed foot-supporting members, one on each side of the bearing member, each foot supporting member having one foot-contact portion thereof extending relatively higher than the corresponding foot-contact portion of the other foot-supporting member and said corresponding foot-contact portion of the other foot-supporting member having a rearward foot-supporting extension, substantially as described.

3. A bicycle pedal comprising a bearing member and a tread member consisting of a metallic strip having its end portions forming foot-supporting members and arranged in substantially parallel planes parallel with the axis of the bearing member, each foot-supporting member having one foot-contact portion thereof extending relatively higher than the corresponding foot-contact portion of the other foot-supporting member, substantially as described.

In testimony, that I claim the foregoing, I have hereunto set my hand this 16th day of May, 1907.

HERMAN BLEIL.

Witnesses:
JOHN W. STEWARD,
WM. D. BELL.